Eugène Germain Paul Mopin
INVENTOR

June 1, 1937.   E. G. P. MOPIN   2,082,116
CONSTRUCTION ADAPTED TO COVER LARGE SURFACES
Filed May 2, 1936   2 Sheets-Sheet 2

Eugène Germain Paul Mopin
INVENTOR
By [signature]
his ATTY.

Patented June 1, 1937

2,082,116

UNITED STATES PATENT OFFICE 2,082,116

CONSTRUCTION ADAPTED TO COVER LARGE SURFACES

Eugène Germain Paul Mopin, Neuilly-sur-Seine, France

Application May 2, 1936, Serial No. 77,530
In France May 21, 1935

6 Claims. (Cl. 108—1)

The present invention has for its object an improved construction covering large surfaces, having no supports other than those situated at the periphery of the said surface and adapted to serve as an aviation shed, exhibition hall, market hall and the like.

The construction according to the invention is chiefly remarkable in that it comprises in combination, an external beam or belt having in plan a polygonal, circular, elliptical or like shape, and consisting of at least two superposed members of same form, rigidly connected together, and a number of rigid radial elements, beams or the like, one end of which is rigidly and immovably connected with or is securely bound in the said external belt. Said radial beams are connected with each one of these superposed elements, and are connected together at their other ends approximately in the center of the structure.

In the annexed drawings, some embodiments of the construction according to the invention have been shown by way of example.

Figure 1:
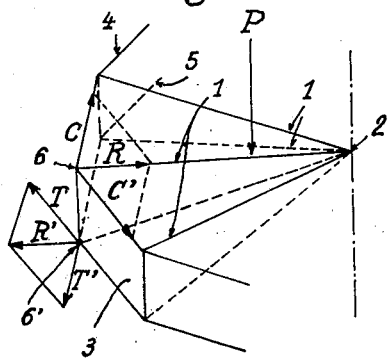
Figs. 1 and 2 show, diagrammatically, a portion of the structure and indicate the stresses it has to withstand.

According to the example of Fig. 1, the structure comprises a certain number of radial elements 1 connected together in any suitable way approximately in the center of the structure at 2. This assembling 2 may be either rigid or pivotal or the like. These elements 1 are rigid and preferably consist of trellis beams. At their other ends they are rigidly secured to or bound in an external belt or beam 3 resting either upon separate supports, or upon a single peripheral continuous or interrupted support, or still in any other way. This beam 3 has in plan the shape of a polygonal, circular, elliptical, or like ring. It consists of at least two belts 4 and 5 having in plan a corresponding shape and being connected together for instance by a trelliswork or any other suitable means.

It is a known fact, that the exterior overloads due to the snow or to the wind, may be positive or negative, and particularly the positive pressure or increase of pressure which is produced inside the structure, and the negative pressure or depression which is produced outside the structure, and which are due to the wind, have as a result a negative overload on the roof, that is an overload having an upward direction, whereas the snow gives a positive overload, that is having a downward direction.

Under the action of the positive and negative overloads positive or negative couples are produced in the rigid connection between the radial beams 1 and the circles or polygons 4, 5, these being thus subjected to compression or to tension. Thus, under the action of a positive overload, the upper polygon is subjected to compression and the lower one to tension, and under the action of a negative overload, the upper polygon is subjected to tension and the lower one to compression.

On Fig. 1 a positive overload has been represented at P. This overload produces in the upper belt 4 a radial centripetal reaction R applied at the point where the radial beam 6 is connected. This reaction is decomposed into two stresses C and C' directed according to the elements of the belt, and it may thus be observed that this latter is subjected to compression. As regards the lower belt 5, the radial beam produces in the point where it is rigidly secured to this belt, at 6', a reaction R' which is centrifugal, is decomposed into T and T', and produces a tensile stress in the belt.

Figure 2:
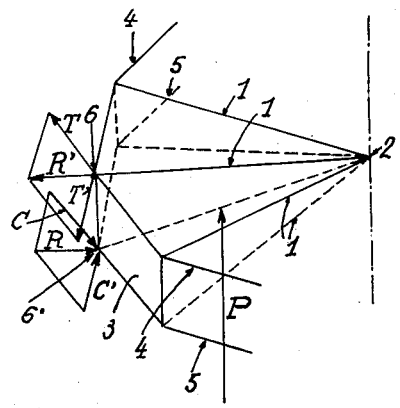

In the case of a negative overload (Fig. 2), the circumstances are of course, reversed; lower belt 5 is subjected to compression stresses and the upper belt 4 is subjected to tensile stresses.

But whatever be the nature of the overload, the two polygons or belts 4 and 5 are simultaneously subjected to strains. It results therefrom, that the weight of these polygons forming the peripheral beam is much lighter than if these polygons were caused to withstand separately a determined overload, that is if for instance, the upper circle had to withstand the positive overloads and the lower circle the negative overloads, this happening generally when instead of radial beams use is made of flexible chains or cables.

Another advantage of this structure resides in that the roof is formed of superposed circles or polygons, and that thus radial rigid beams permit of diminishing to a minimum the number of supports or posts and to reduce this number to four or even to three providing for very large entrances.

Figure 3:
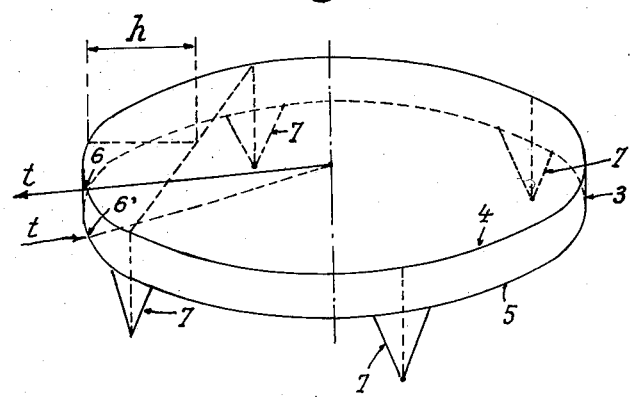
Figs. 3 and 4 show, diagrammatically, the entire construction.

In fact, the moment of torsion due to the overhang $h$ of the peripheral beam 3 (Fig. 3) formed by the two circles 4 and 5 and the suitable trelliswork, will have a tendency to produce a downward deflection of the belt. As this belt is quite rigid, this overhang will produce a compressive stress in the lower belt member 5 and a tensile stress in the upper belt member 4. These two stresses may be regarded as the consequence of a couple $t—t$ which will tend to deflect the belt. However, such a deflection is impossible, as the two stresses $t—t$ are absorbed by the frame pieces of the rigid radial members I, which are rigidly connected to the belts 4, 5. This is of course impossible if the radial beams are not quite rigid and are for instance replaced by cables.

In this latter case the peripheral beams should be constructed in such a way as to be able to withstand alone the moment of torsion, that is they should be reinforced and a greater number of belts and a heavier trelliswork should be employed, this producing a serious increase of the weight of the beam.

On the other hand, the fact that each reaction of the radial beams is received by a single belt permits of subjecting this belt to the maximum stress, this being impossible in the case where these stresses should be received by two or more concentrical belts; it is known, in fact, that the unitary tensile stresses in these concentrical circles depend upon the distances of these latter from the centre, and consequently, that these stresses are different in the various circles, or in other words, that it would be impossible to use to the maximum the proper resistance of each circle.

Another advantage resides, moreover, in that the rigid roof constructed according to the invention, very well withstands unsymmetrical stresses or horizontal loads, as all the stresses and bending moments are entirely transmitted to and absorbed by the rigid belts 4, 5.

Figure 4:
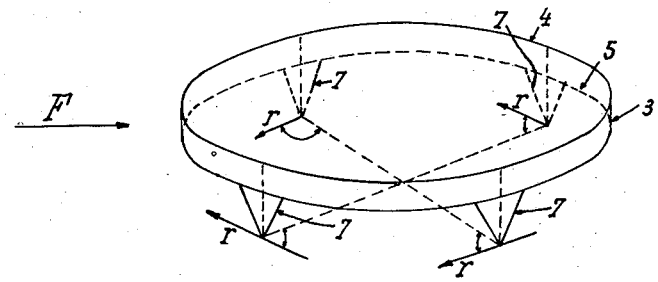

Fig. 4 permits to see a still other advantage of the new construction. It shows, diagrammatically, the peripheral beam resting upon four separate supports 7. As the beam 3 simply rests upon its supports, these latter are only subjected to the load thereof and to the action of the wind the direction of which is F.

These supports or posts will thus have to withstand only compressive stresses due to the load of belt 3 and tangential reactions $r$.

Obviously, the fastening of the rigid or like covering or glazing elements can be very easily performed due to the rigidity of the beams of the construction; this advantage does, of course, not exist in the case where nonrigid radial elements are used, the deformation of these elements diminishing the solidity of the covering or glazing.

Figures 5 to 8 show diagrammatically a shed according to the invention. The peripheral beam 3 is here polygonal and consists of two superposed belts 4 and 5 connected by a trelliswork 8. It rests upon posts 7. The rigid radial beams 1 comprise webs or frame pieces 9 and a trelliswork 10. They are connected together at 2 in the center of the construction.

The structure thus formed may be closed at its periphery by a door 11 of any suitable type.

Figure 5:
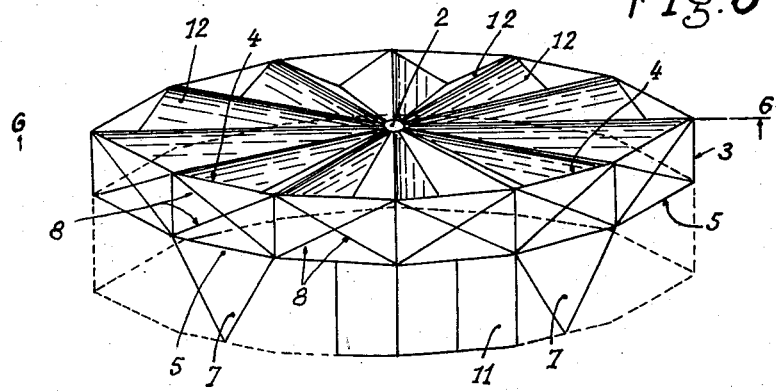
Fig. 5 is a perspective view of the general form of a construction in conformity with the invention.
Figure 6:
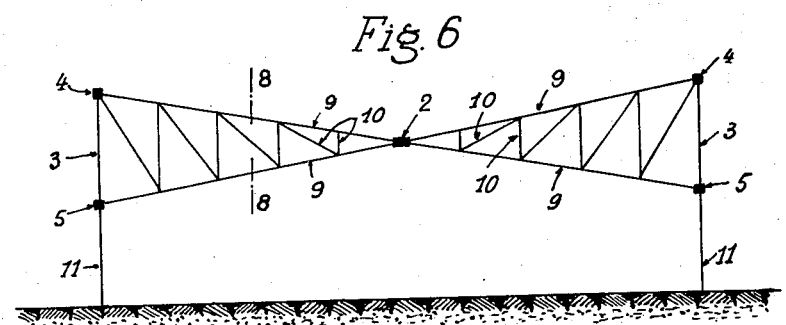
Fig. 6 shows the same construction in section according to line 6—6 of Fig. 5.
Figure 7:
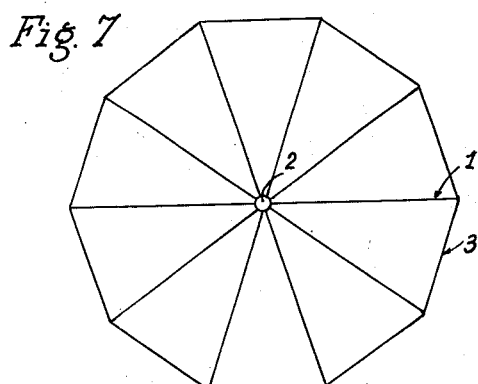
Fig. 7 is a corresponding plan view.
Figure 8:
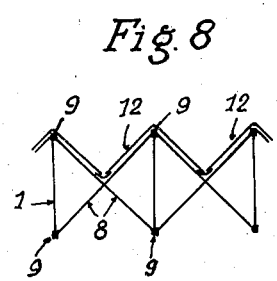
Fig. 8 is a section on line 8—8 of Fig. 6.

Figures 5 and 8 show the method of mounting of the covering elements 12 on the radial beams.

Figure 9:
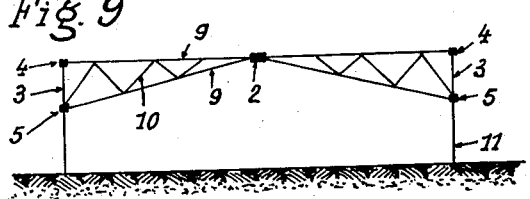
Fig. 9 is an analogous section of another embodiment of the invention.

Figure 9 shows another form of the radial beams. The stresses are, of course, disposed here in a different way.

The webs or frame-pieces of the radial beams may also be curved and have any suitable cross-sections, as well as the rigid portions or frame-pieces of the peripheral belts.

The structure may be executed by means of any suitable material, wood, steel, "duralumin", and the like.

Naturally, the invention is in no way limited to the embodiments represented and described which have been only chosen as examples.

Having now described my invention, what I claim as new and desire to secure by Letters Patent, is:

1. A construction of the type referred to comprising a peripheral belt shaped element, consisting of at least two superposed members of same form and which are rigidly connected together, and a number of rigid elements disposed radially of said belt shaped element, these radial elements being at their one end rigidly connected with each one of said superposed members and at their other end connected together practically in the center of the structure.

2. A construction according to claim 1, wherein each of said radial members comprises at least two superposed frame-pieces, each of which is rigidly connected to one of said superposed members of the belt.

3. A construction according to claim 1, wherein said superposed members have in plan a polygonal form.

4. A construction according to claim 1, wherein said superposed members have in plan a circular form.

5. A construction adapted to cover large surfaces and to serve as aviation shed, market hall or the like, comprising peripheral support means, a belt shaped peripheral member consisting of at least two superposed and rigidly connected preferably ring shaped members, said belt shaped member resting on said supporting means, and a number of rigid elements disposed radially of said belt shaped member, these radial elements being rigidly connected at one of their ends, with each of said superposed members, and at their other ends and practically in the center of the construction connected together.

6. A construction according to claim 5, further comprising covering elements disposed on said radial elements.

EUGÈNE GERMAIN PAUL MOPIN.